US006807719B2

(12) United States Patent
Herr et al.

(10) Patent No.: US 6,807,719 B2
(45) Date of Patent: Oct. 26, 2004

(54) AUTOMATIC VARIABLE SHEAR FOR BRIDGED AND UNBRIDGED TERMINAL INSERTION

(75) Inventors: Marlin Edward Herr, Gardners, PA (US); John Michael Wasilko, Harrisburg, PA (US); Christopher John Karrasch, Boiling Springs, PA (US); George Edward Hoover, Dover, PA (US)

(73) Assignee: Tyco Electronics Corporation, Middletown, PA (US)

( * ) Notice: Subject to any disclaimer, the term of this patent is extended or adjusted under 35 U.S.C. 154(b) by 186 days.

(21) Appl. No.: 10/269,660

(22) Filed: Oct. 11, 2002

(65) Prior Publication Data

US 2003/0070281 A1 Apr. 17, 2003

Related U.S. Application Data

(60) Provisional application No. 60/328,850, filed on Oct. 12, 2001.

(51) Int. Cl.[7] .................................................. B23P 19/00

(52) U.S. Cl. ........................ 29/564.6; 29/564.2; 29/565; 29/33 K; 29/33 M; 29/759; 29/827

(58) Field of Search ............................ 29/564.6, 564.1, 29/564.7, 564.8, 564.2, 565, 33 K, 33 M, 33 Q, 33 S, 759, 747, 827, 884

(56) References Cited

U.S. PATENT DOCUMENTS 3,576,063 A * 4/1971 Bakermans .................. 29/747
3,641,649 A * 2/1972 Busler et al. .............. 29/564.6
3,739,446 A * 6/1973 Long et al. .................... 29/565
3,848,316 A 11/1974 Bakermans et al.
3,984,908 A 10/1976 Ackley
4,099,316 A 7/1978 Morgan et al.
5,832,597 A * 11/1998 Yokoyama et al. ........ 29/564.6

FOREIGN PATENT DOCUMENTS

JP 58-061931 S * 4/1983

OTHER PUBLICATIONS

European Search Report; Application No. EP 02 25 7068; dated Nov. 20, 2003.

* cited by examiner

*Primary Examiner*—Erica Cadugan
*Assistant Examiner*—B. Ross
(74) *Attorney, Agent, or Firm*—Barley, Snyder, Senft & Cohen, LLC

(57) ABSTRACT

An apparatus for inserting terminals carried on a carrier strip into cavities in a housing having a slide assembly with a cam track movable between a first and a second position, and a pivoting lever with a cam follower. The cam follower is positioned in and cooperates with the cam track. The lever is movable between an open and closed position and has first and second shearing blades. An eccentric pin extends through the lever and is attached to a rotary actuator. The eccentric pin is positioned to act as the pivot point for the lever. The rotary actuator is movable between an engaged and disengaged position. As the lever is moved to the closed position, the first shearing blades engage and shear a first portion of the carrier strip. As the rotary actuator moves to an engaged position, the second shearing blade engages and shears a second portion of the carrier strip.

28 Claims, 14 Drawing Sheets

AUTOMATIC VARIABLE SHEAR FOR BRIDGED AND UNBRIDGED TERMINAL INSERTION

"This application claims the benefit of U.S. Provisional Application(s) No(s). 60/328,850, filed Oct. 12, 2001."

FIELD OF THE INVENTION

The invention relates to an apparatus for inserting displation type terminals into cavities in a workpiece. More specifically, the invention relates to an apparatus that inserts both bridged and unbridged terminals into cavities in a workpiece.

BACKGROUND OF THE INVENTION

The term "displation" has been coined to identify and describe a type of wire connection in which a wire is moved relatively into a narrow slot in a terminal, the width of the slot being such that the edges of the slot penetrate the insulation of the wire and establish electrical contact with a conducting core of the wire. A wide variety of displation type contact terminals and methods of making electrical connections with the wires of coil windings, such as are used in motor stators, induction coils, and elsewhere, are known in the electrical industry.

U.S. Pat. No. 3,984,908 discloses a known type of insertion apparatus for inserting displation type terminals into cavities in a workpiece. In general, U.S. Pat. No. 3,984,908 discloses a terminal comprising a U-shaped member having a pair of parallel plate sections connected by a bight. A relatively wide gap or opening is provided in the bight. Slots are provided in the plate sections that extend to the gap or opening so that the wire may be moved laterally in respect to its axis through the opening and into the wire-receiving slots. The apparatus is intended to insert terminals into a plastic frame or housing of a stator. The wire from the stator winding is positioned with its axis extending transversely in respect to a cavity in the plastic stator frame. As the terminal is pushed into the cavity, the wire is moved relatively into the slot of the terminal. A shearing blade trims an end portion of the wire. The cut end is dragged into the cavity such that the cut is not exposed after the terminal is fully inserted. The apparatus has certain limitations that restrict its use under many of the circumstances and working conditions under which displation type connections are mated to the wires of coil windings.

U.S. Pat. No. 4,099,316 discloses an apparatus for inserting displation type terminals in strip form into cavities in a coil bobbin or the like. The strip of terminals is fed into the apparatus where the terminals are sheared from the strip and inserted into cavities in a workpiece. As the terminals are inserted into the workpiece, the terminals move past wires extending from a coil in the workpiece and drag the wires into the cavities as end portions of the wires are sheared. The apparatus is compact and may be mounted on a workbench and manually operated under circumstances where an operator places an individual workpiece on the apparatus, actuates the apparatus, and removes the workpiece from the apparatus after wire terminations have been made. The apparatus may be mounted adjacent to or on a fully automatic assembly machine so that it might become an integrated part of the machine. The apparatus is limited in that it does not allow for both bridged and unbridged terminals to be inserted into the workpiece without changing tooling.

It is therefore desirable to develop an apparatus that is not limited in use and can insert bridged and unbridged terminals into a workpiece without changing tooling.

SUMMARY OF THE INVENTION

The invention is directed to an apparatus for inserting bridged and unbridged terminals initially carried on a carrier strip into cavities in a housing. The apparatus has a slide assembly with a cam track movable between a first and second position, and a pivoting lever with a cam follower. The cam follower is positioned in and cooperates with the cam track. The pivoting lever is movable between an open position and a closed position and has first and second shearing blades that cooperate with an end of the lever opposite the cam follower end. An eccentric pin extends through the pivoting lever and is attached to a rotary actuator. The eccentric pin is positioned to act as the pivot point for the pivoting lever. The rotary actuator is movable between an engaged and disengaged position. As the pivoting lever is moved to the closed position, the first shearing blades engage and shear a first portion the carrier strip of the terminals. As the rotary actuator is moved to the engaged position, the second shearing blade engages and shears a second portion of the carrier strip.

DETAILED DESCRIPTION OF THE EMBODIMENT

FIGS. 1–20 show a machine or apparatus that removes terminals 2 from a terminal strip 23 and inserts the terminals 2 into cavities 4 of a housing 16. The apparatus may insert the terminals 2 into the housing 16 in both a bridged or unbridged condition without the need to change tooling. For ease of explanation and in order to facilitate the understanding of the invention, the general principles of the apparatus are illustrated in the semi-diagrammatic views of FIGS. 1–9. The operation of the apparatus will first be described with reference to FIGS. 1–9 to facilitate the later description of detailed features of the apparatus.

Figure 6:
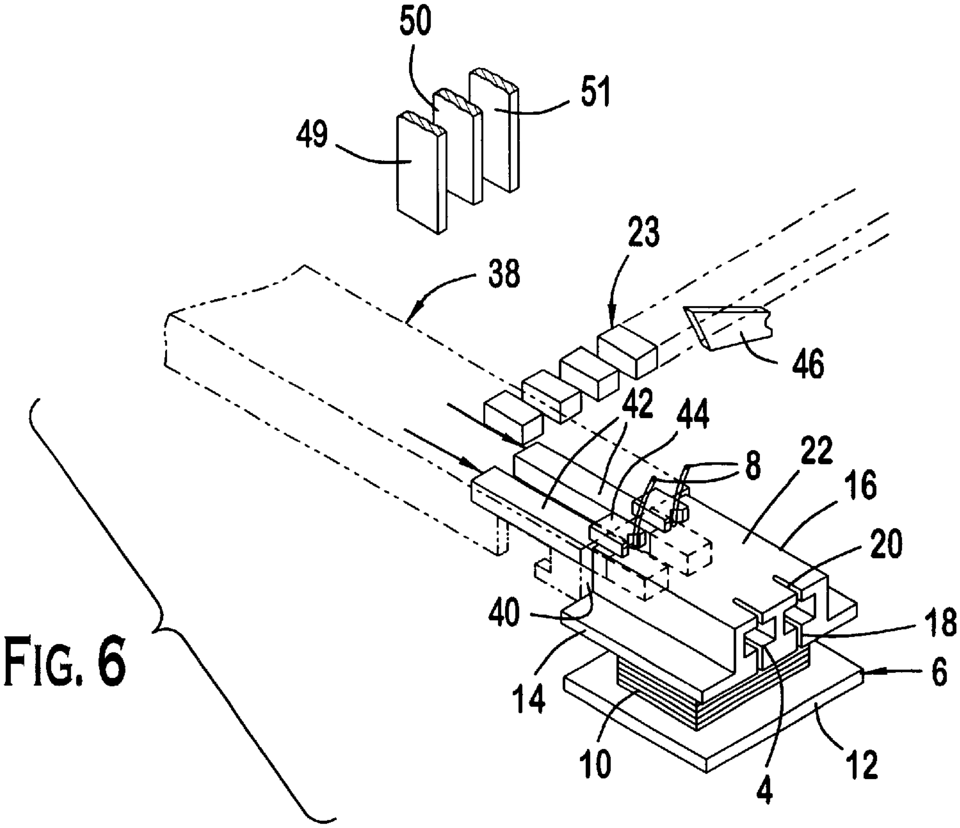
Figure 7:
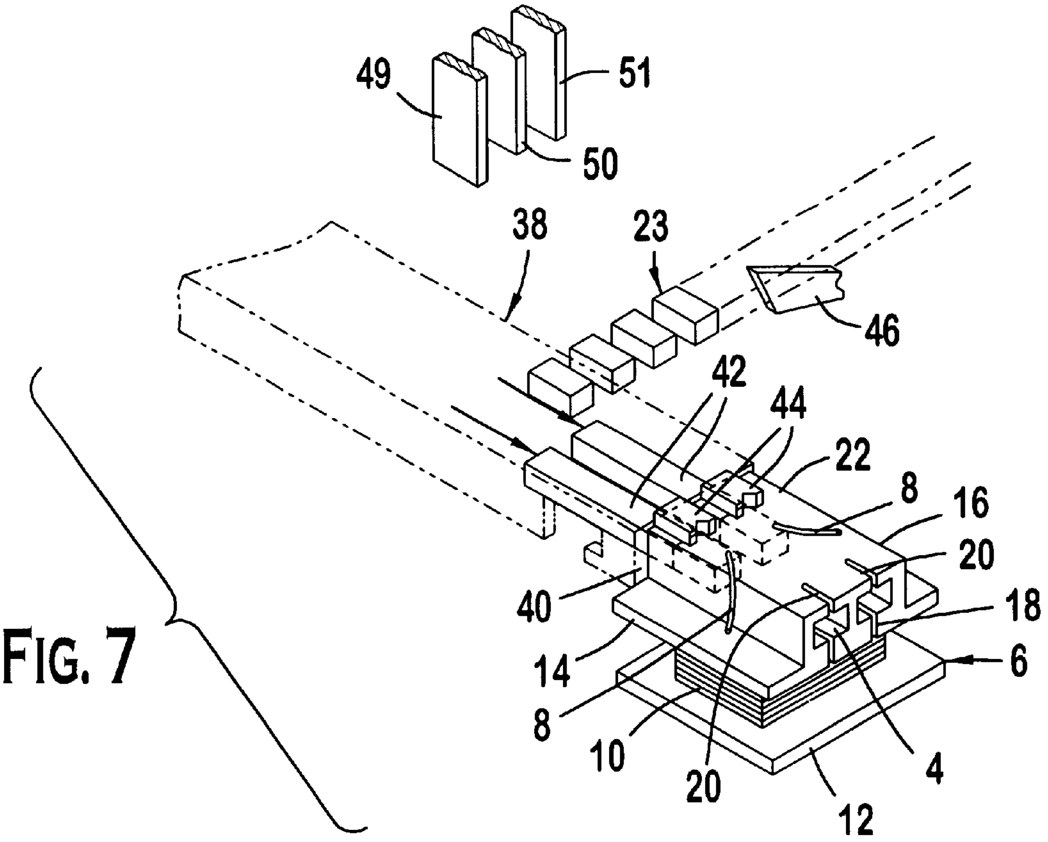
Figure 8:
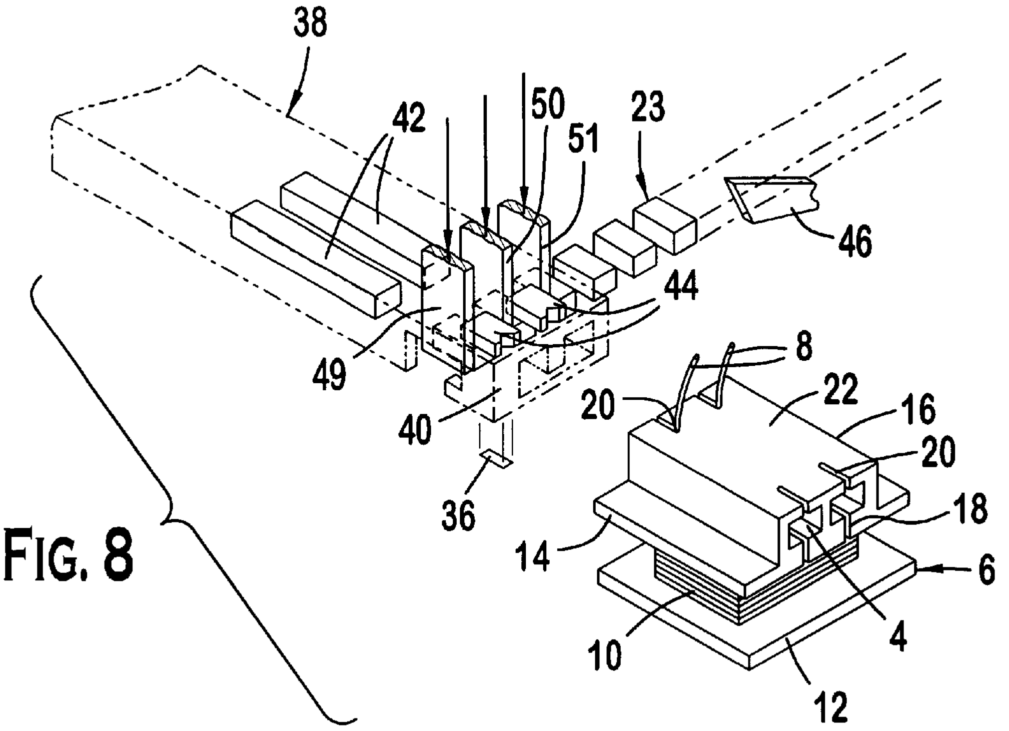
FIGS. 8 and 9 are perspective semi-diagrammatic views similar to FIGS. 3 and 4 showing the stages of the operating cycle in which the center shear blade and end shear blades are further advanced so that the center shear cuts the carrier strip and individual unbridged terminals are produced.
Figure 9:
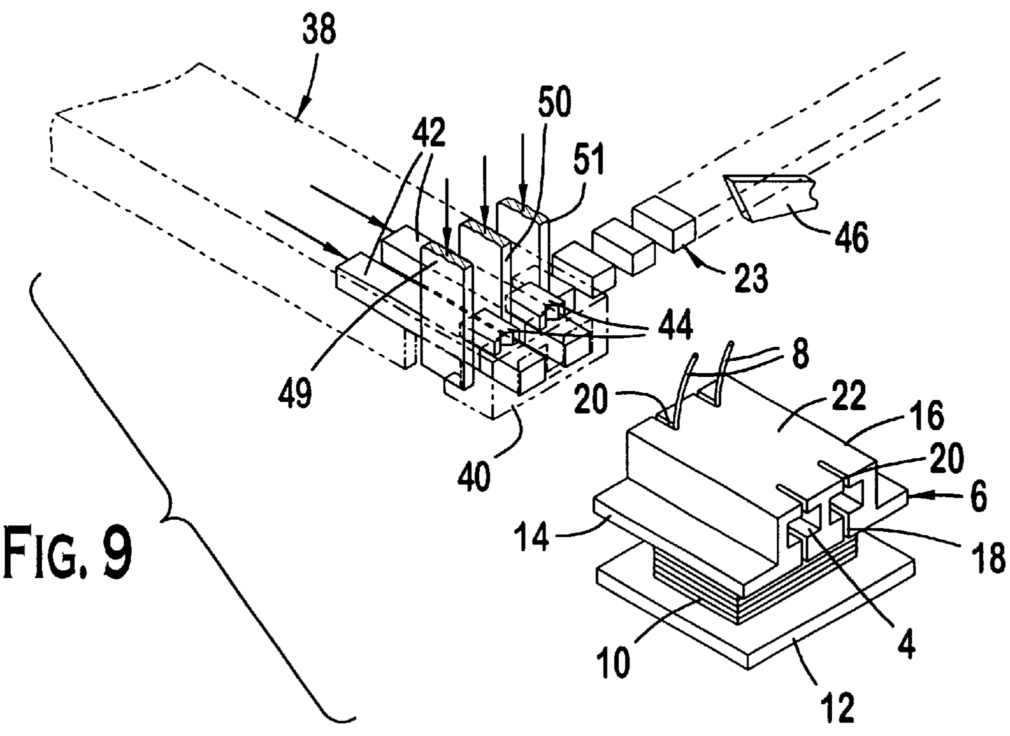
Figure 10:
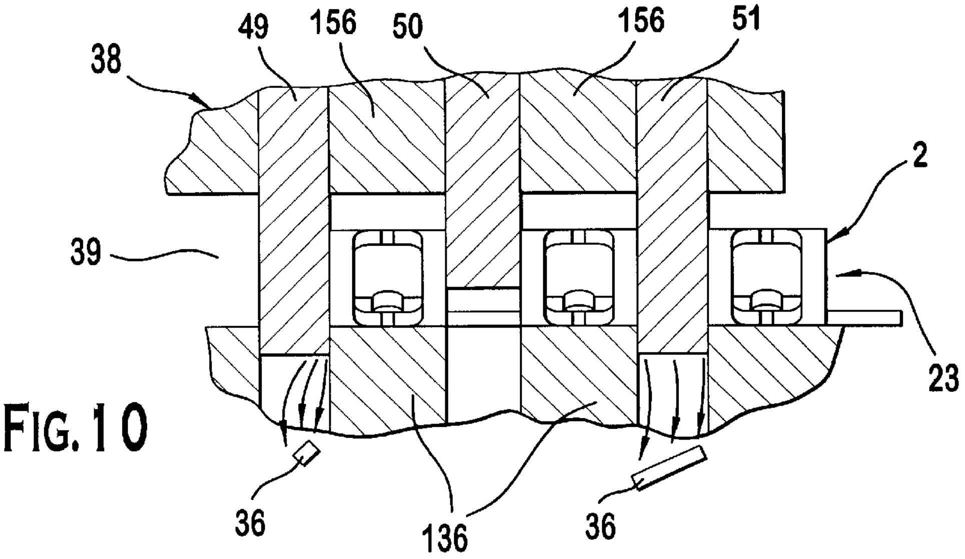
FIG. 10 is a fragmentary section view taken vertically through the terminal guide tube illustrating the end shearing blades shearing the carrier strip to produce bridged terminals.
Figure 11:
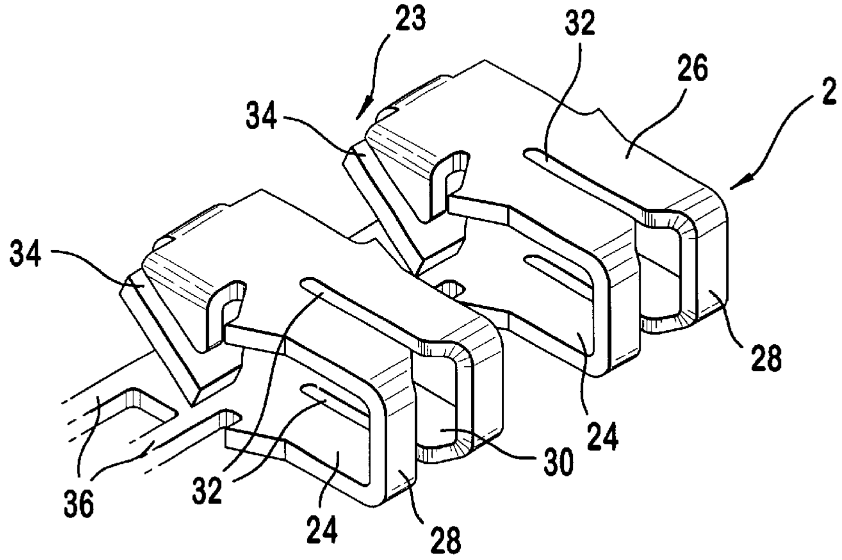
FIG. 11 is a perspective view of a section of the terminal strip of the type intended for use with the apparatus shown.
Figure 12:
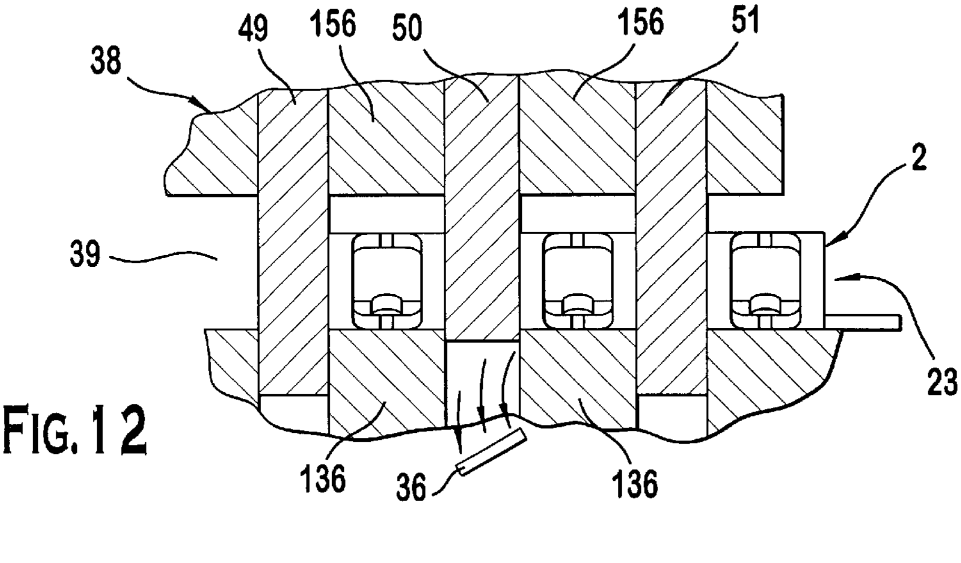
FIG. 12 is a fragmentary section view taken vertically through the terminal guide tube illustrating the middle shearing blade shearing the carrier strip to produce unbridged terminals.

As shown in FIGS. 1–9, the apparatus has a guide member 38 that inserts individual or multiple terminals 2 into cavities 4 of a plastic coil bobbin 6. The bobbin 6 has spaced-apart end flanges 12, 14 between which a coil 10 is wound and is held by a fixture or work holder (not shown) adjacent to an insertion zone 39 on the apparatus. End portions 8 of wires extending from the coil 10 on the bobbin 6 are positioned in slots 18, 20 provided in the end flange 14 and the integral housing 16 of the bobbin 6. The terminals 2 shown in FIGS. 1–9 are diagrammatic representations only. A more detailed depiction of the terminals 2 is shown in FIG. 11. The terminals 2 may be joined or bridged (shunted) to each other, as represented in FIGS. 1–7 and 10 or may be separated or unbridged, as represented in FIGS. 8–9 and 12.

As shown in FIG. 11, each terminal 2 has a pair of spaced-apart parallel plate-like members 24, 26 that are connected by a bight or web 28. A gap or opening 30 is provided in the web 28 and wire-receiving slots 32 extend into the plate-like members 24, 26 from the opening 30 so that the wire may be moved laterally in respect to its axis, through the opening 30 and into the slots 32. The terminal 2 has a reversely formed extension 34 on the plate 26 that extends toward an internal surface of the plate-like member 24 so that a further conductor, such as, a pin or wire end, may be connected to the terminal 2 by inserting the further conductor and locating it between an end of the extension 34 and an internal surface of the plate-like member 24. The terminals 2 are manufactured in the form of a continuous strip 23 with a carrier strip means 36 extending between adjacent terminals 2 in the continuous strip 23. Although the terminals are shown and described herein, the scope of the invention is not limited to an apparatus that terminates only the terminals shown, rather terminals of various configurations may be used without departing from the scope of the invention.

As shown in FIGS. 1–9, the guide member 38 has an insertion zone 39 a pair of side-by-side inserters 42 slidably contained therein. A pair of wire cutters 44 are slidably mounted in the guide member 38 above the inserters 42. The wire cutters 44 are located such that the wire cutters 44 will move over the upwardly facing surface 22 of the housing 16 of the bobbin 6 mounted on the work holder (not shown) in the insertion zone 39. The terminal strip 23 is fed towards one side of the guide member 38 to position two leading terminals 2 of the terminal strip 23 in the guide member 38 and in front of the inserters 42.

Figure 1:
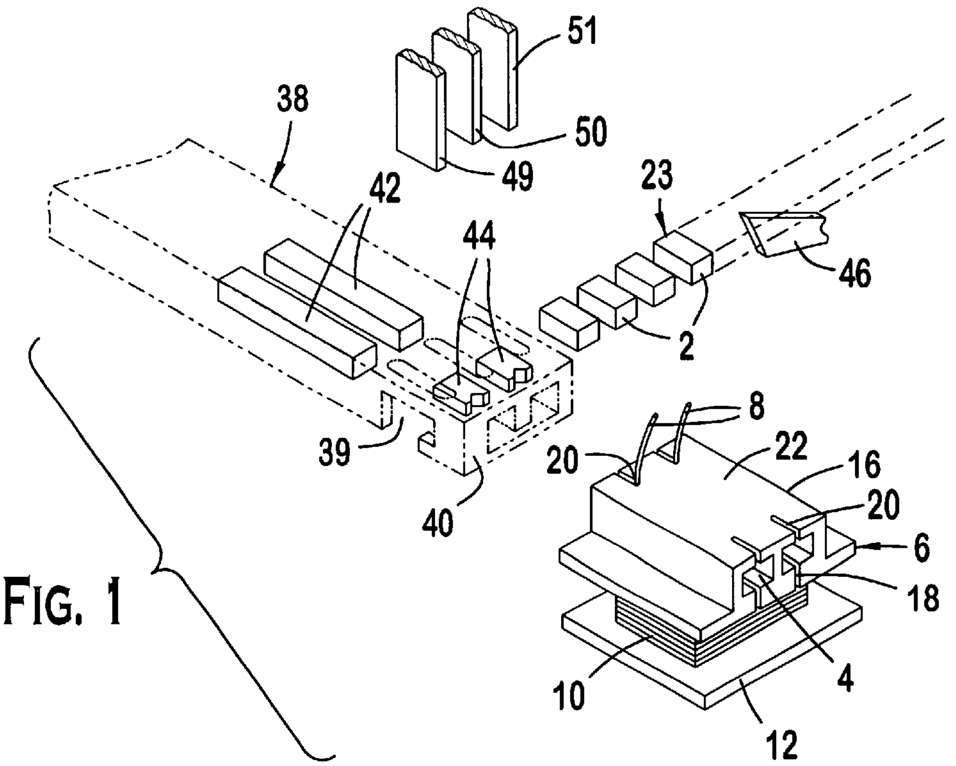
FIG. 1 is a perspective semi-diagrammatic view showing some of the elements of the apparatus in a position prior to commencement of an operating cycle.
Figure 2:
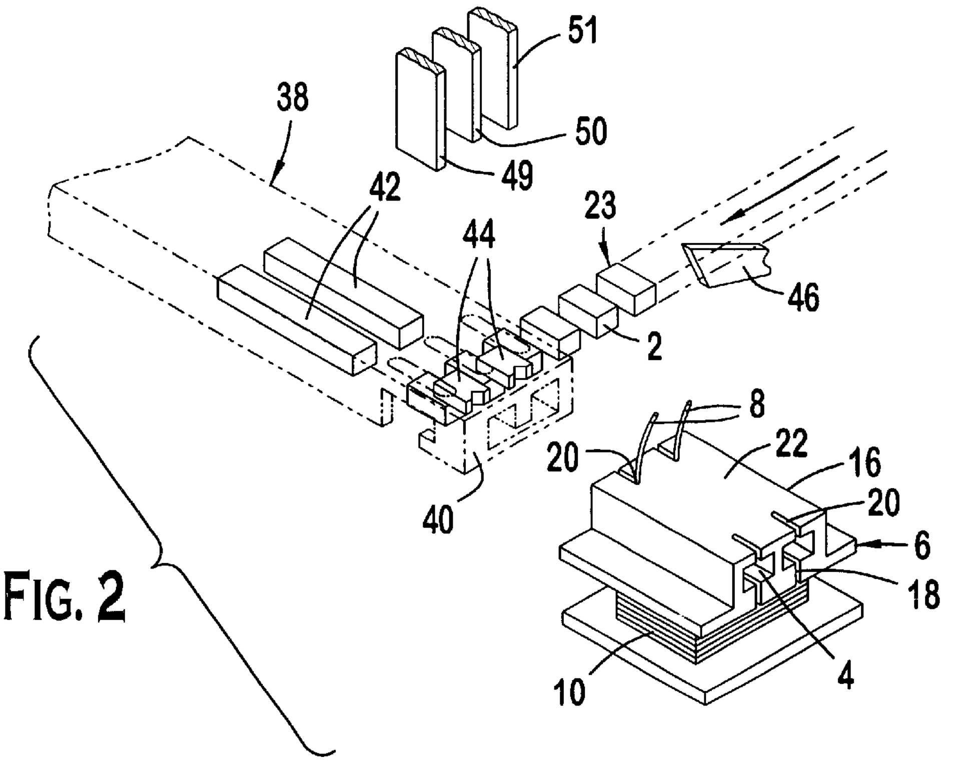
FIGS. 2–7 are perspective semi-diagrammatic views similar to FIG. 1 showing the positions of the elements at successive stages of the operating cycle in which a center shear blade does not cut the carrier strip and the terminals remain bridged.
Figure 3:
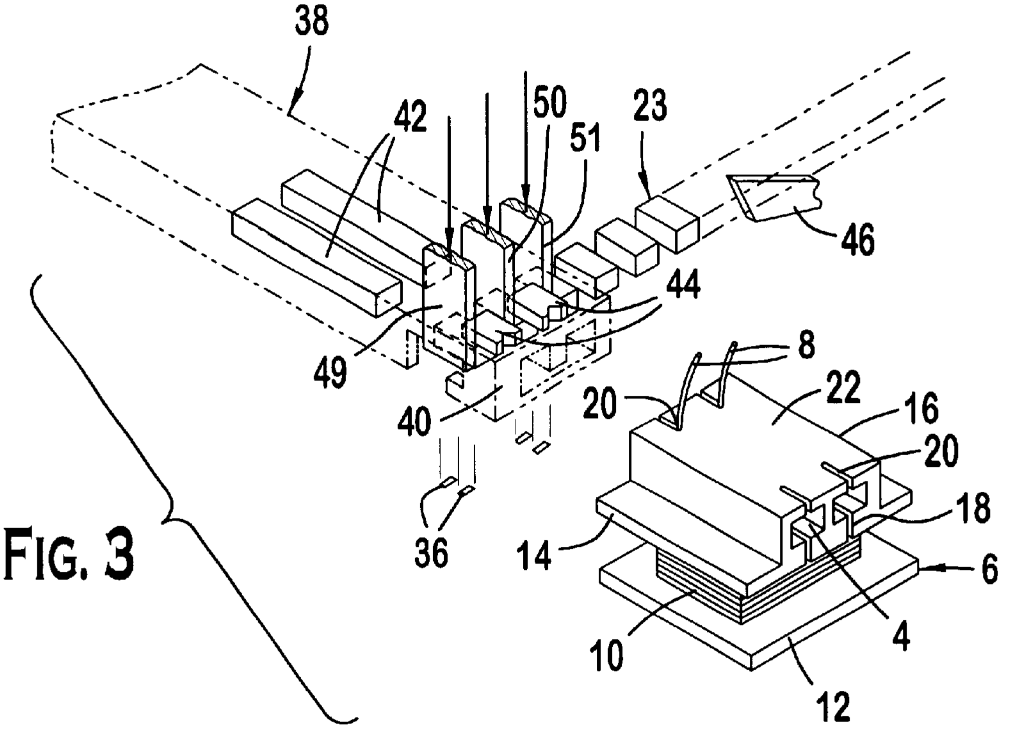

Referring to FIGS. 1 and 2, the terminal strip 23 is advanced by means 46 from a first position to a second position in which the terminals 2 are received in the insertion zone 39 of the guide member 38 in front of the inserters 42. When the bridged or unbridged terminals 2 are to be inserted into the bobbin 6, the leading terminals 2 are sheared from the terminal strip 23 by the movable shearing blades 49, 50, 51 that move downwardly through openings in the guide member 38, as shown in FIG. 3. The end shearing blades 49, 51 extend further downward than the middle shearing blade 50. The end shearing blades 49, 51 engage the carrier strip means 36 and sever the carrier strip means 36, as shown in more detail in FIG. 10. This shearing action separates the two leading terminals 2 from the terminal strip 23 and removes the carrier strip means 36 from respective sides of the terminals 2. In this first lowered or termination position, the middle shearing blade 50 is positioned approximately 0.050 inches above the carrier strip means 36. The downward motion of the middle shearing blade 50 is stopped so that the middle shearing blade 50 does not engage the carrier strip means 36 and does not sever the two terminals 2 from each other so that the two terminals 2 remain bridged or shunted.

Figure 4:
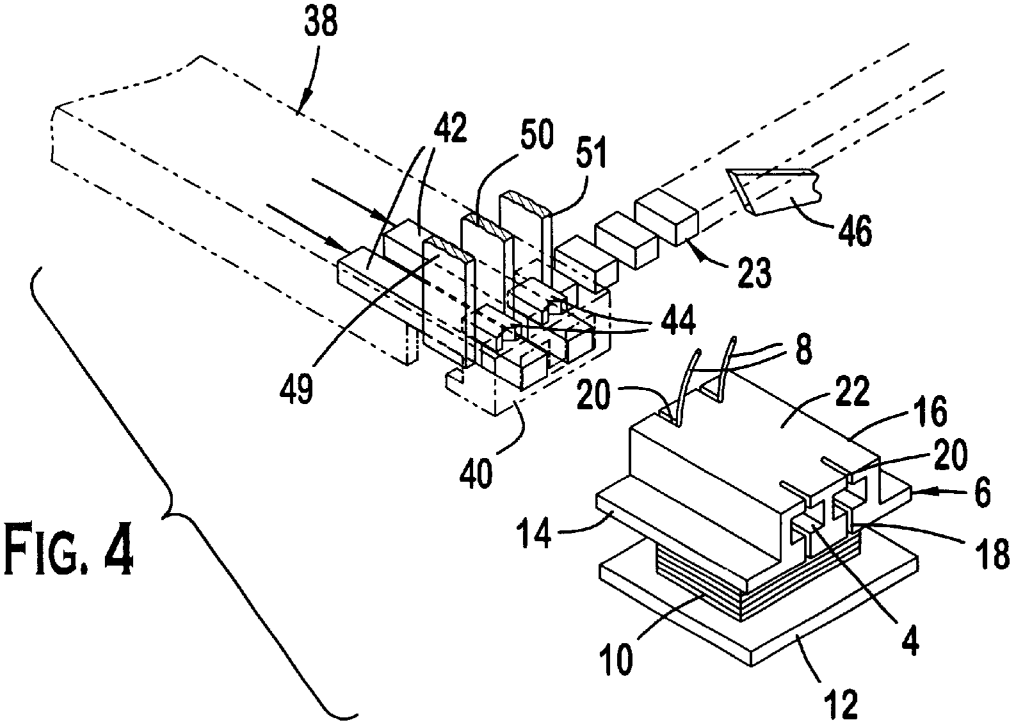
Figure 5:
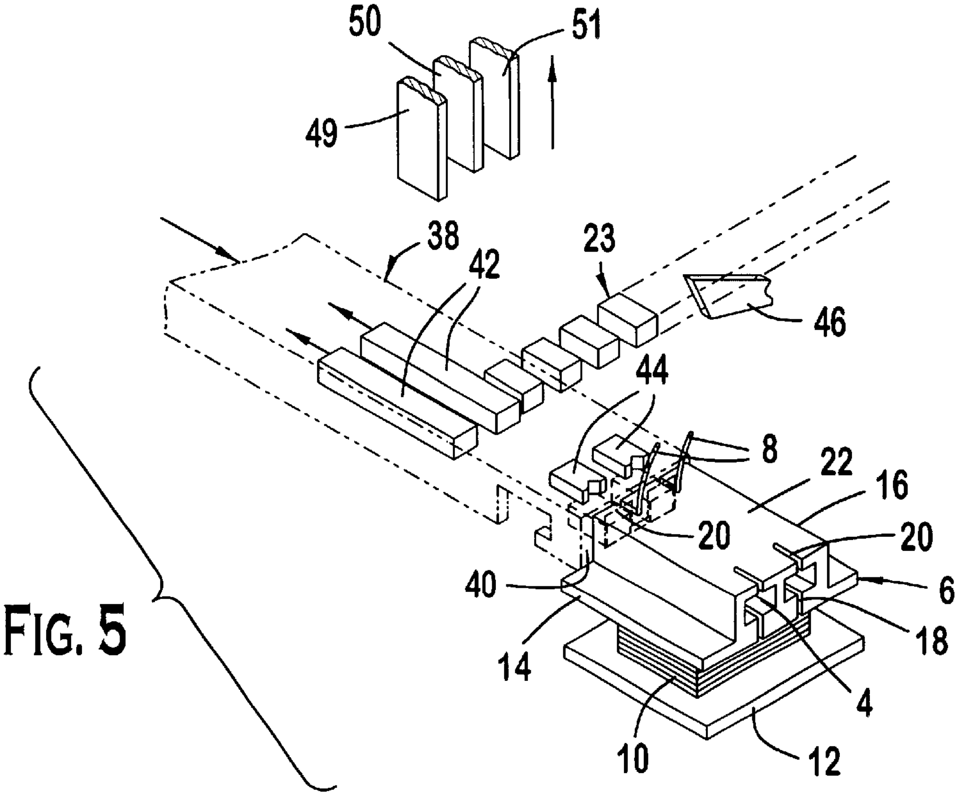

Referring to FIG. 4, the end shearing blades 49, 51 remain in the lowered position while the inserters 42 move a short distance forward. Side surface of the shearing blades 49, 50, 51 serve as guide surfaces for the terminals 2 during this portion of the cycle so that the terminals 2 will be accurately positioned adjacent to the face 40 of the guide member 38. The guide member 38 remains stationary during such movement of the inserters 42 so that the terminals 2 are positioned with the web 28 at a face 40 of the guide member 38. Thereafter, the inserters 42 are retracted, as shown in FIG. 5. At this stage, the face 40 of the guide member 38 is against the housing portion 16 of the bobbin 6 and the terminals 2 are in alignment with the cavities 4. As shown in FIG. 6, the wire cutters 44 are moved towards the bobbin 6 while the guide member 38 remains stationary. The inserters 42 and the wire cutters 44 are thereafter moved towards the bobbin 6 to insert the terminals 2 into the cavities 4 and to shear off the projecting end portions 8 of the wires, as shown in FIGS. 7–9. The timing of this portion of the operating cycle is such that the end portions 8 of the wires are sheared prior to completion of the insertion so that the sheared ends 8 of the wires are dragged by the terminals 2 into the cavities 4 and are not exposed at the surface 22 of the housing portion 16 of the bobbin 6.

When individual or unbridged terminals 2 are required to be inserted into the bobbin 6, the terminal strip 23 is advanced in the manner previously described. Once properly positioned, the leading terminals 2 are sheared from the terminal strip 23 by the movable shearing blades 49, 50, 51 that move downwardly through the openings in the guide member 38. As the end shearing blades 49, 51 extend further downward than the middle shearing blade 50, the end shearing blades 49, 51 initially engage the carrier strip 36 and sever the carrier strip 36, as described above. A separate drive mechanism is then engaged to continue the downward motion of the shearing blades 49, 50, 51 until the middle shearing blade 50 also engages the carrier strip 36 and severs the carrier strip 36 between the leading terminals 2, as shown in more detail in FIG. 12.

Referring to FIGS. 8 and 9, the shearing blades 49, 50, 51 remain in the lowered positions while the inserters 42 move a short distance forward. Side surface of the shearing blades 49, 50, 51 serve as guide surfaces for the terminals 2 during this portion of the cycle so that the terminals 2 will be accurately positioned adjacent to the face 40 of the guide member 38. The guide member 38 remains stationary during such movement of the inserters 44 so that the terminals 2 are positioned with the web 28 at the face 40 of the guide member 38. Thereafter, the inserters 42 are retracted. At this stage, the face 40 of the guide member 38 is against the housing portion 16 of the bobbin 6 and the terminals 2 are in alignment with the cavities 4. The wire cutters 44 are moved towards the bobbin 6. The guide member 38 remains stationary and the inserters 42 and the wire cutters 44 are thereafter moved towards the bobbin 6 to insert the terminals 2 into the cavities 4 and to shear off the projecting end portions 8 of the wires. As discussed above, the timing of this portion of the operating cycle is such that the end portions 8 of the wires are sheared prior to completion of the insertion so that the sheared ends 8 of the wires are dragged by the terminals 2 into the cavities 4 and are not exposed at the surface 22 of the housing portion 16 of the bobbin 6.

Figure 13:
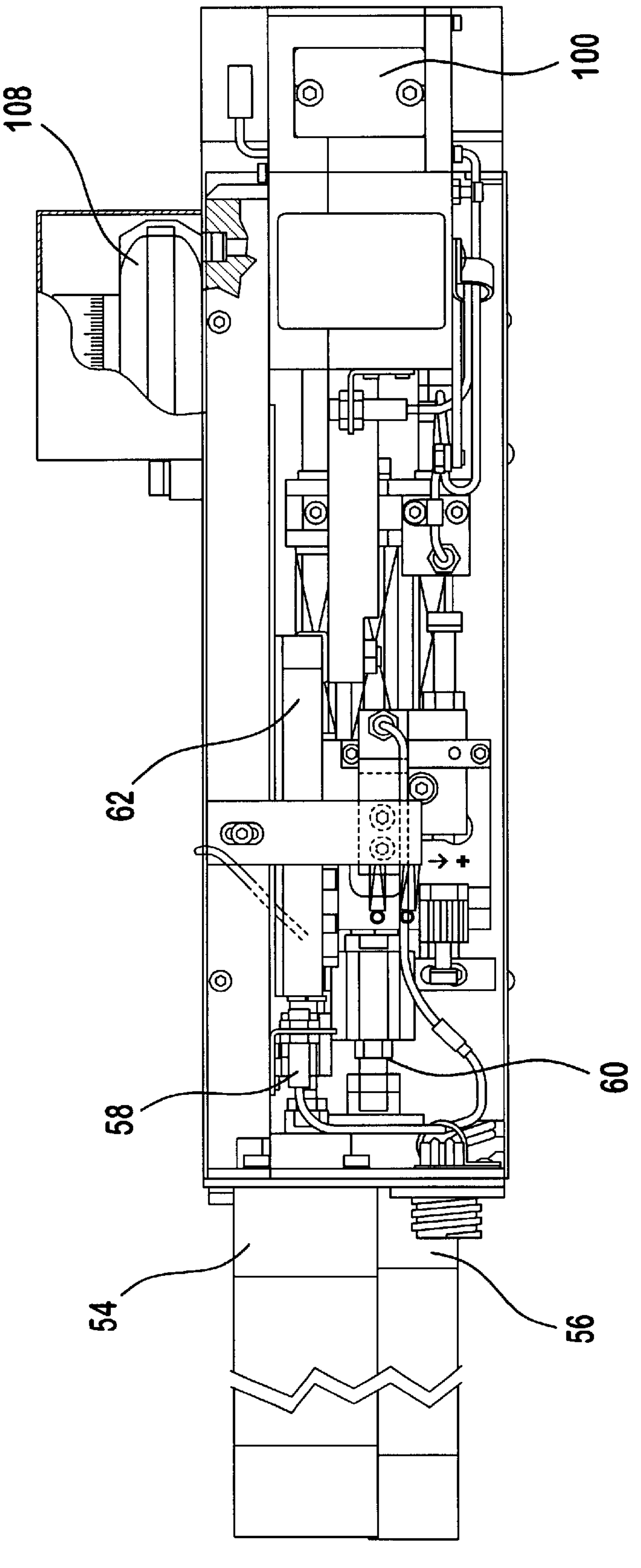
FIG. 13 is a top plan view of the apparatus in accordance with the invention.
Figure 14:
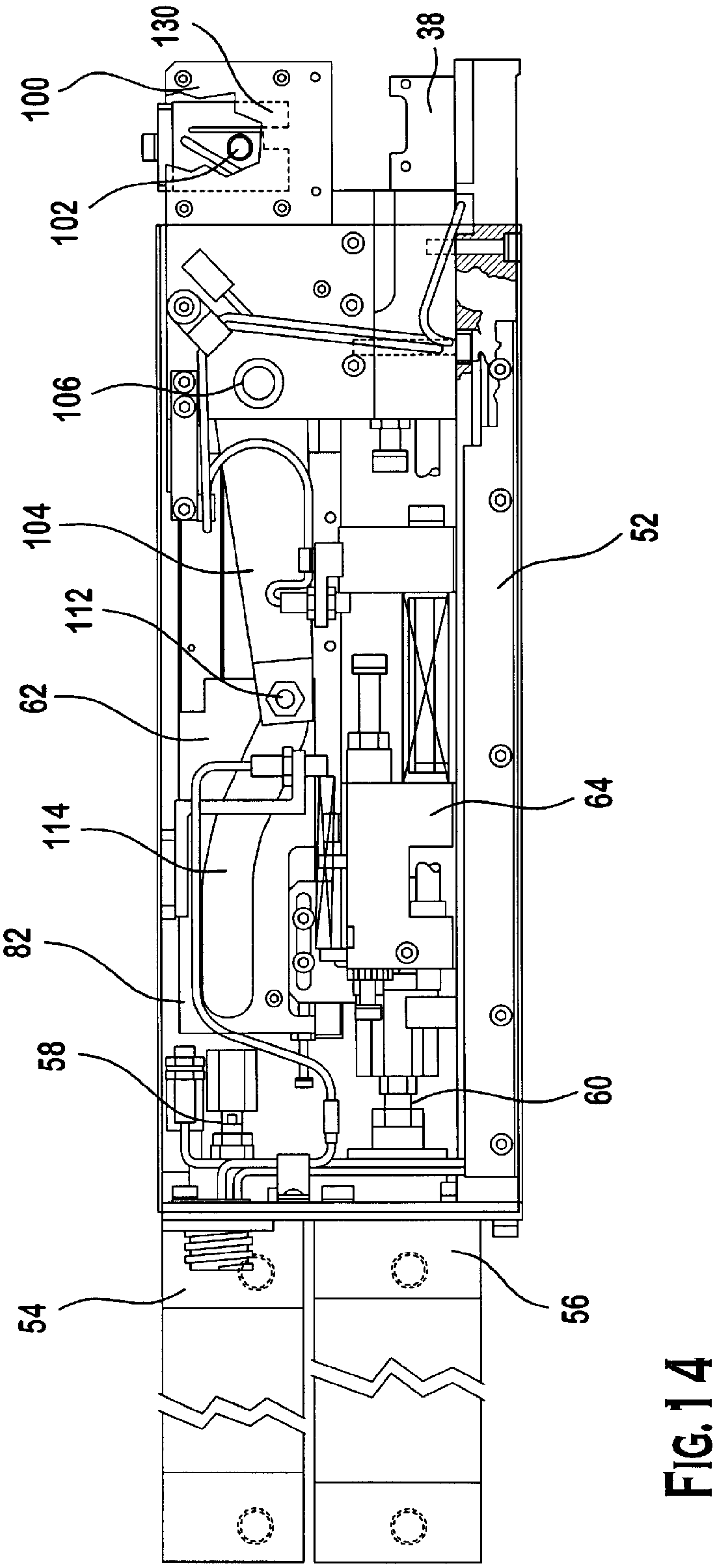
FIG. 14 is a side plan view of the apparatus shown in FIG. 12.

The detailed features of the apparatus will now be described in greater detail with reference to FIGS. 13–20. As shown in FIGS. 13 and 14, the apparatus has a base plate 52 that may be supported in an assembly machine, on a workbench or other surface. First and second side-by-side cylinders 54, 56 have first and second piston rods 58, 60, respectively, extending therefrom. The first piston rod 58 is coupled to a first slide sub-assembly 62 and the second piston rod 60 is coupled to a second slide sub-assembly generally indicated at 64. The first slide sub-assembly 62 controls the movement of the shearing blades 49, 50, 51 and the second slide sub-assembly 64 controls the movement of the inserters 42 and the wire cutters 44. As the operation of the second slide sub-assembly 64 is known in the art, the second slide sub-assembly 64 will not be described in detail herein.

Figure 15:
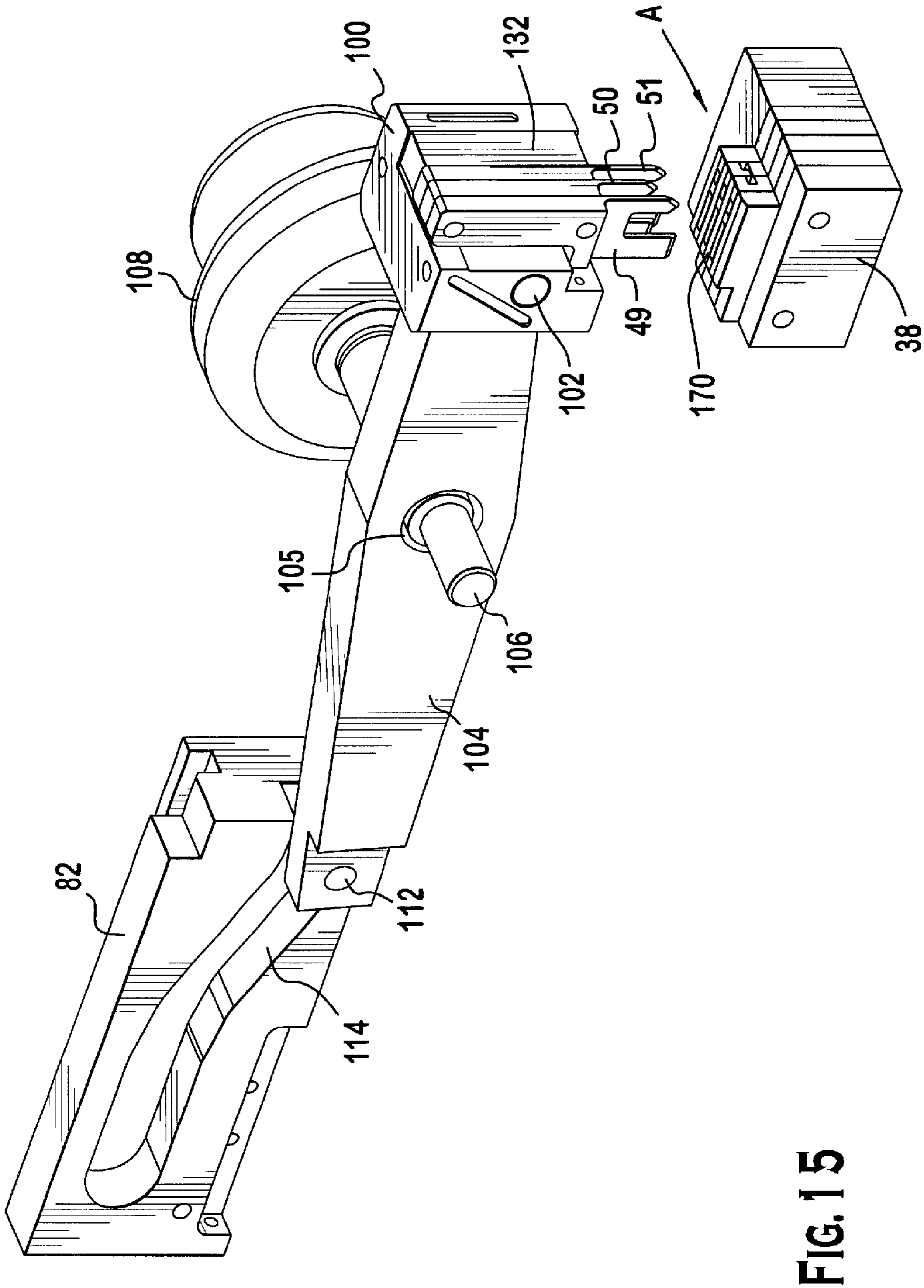
FIG. 15 is a partial perspective view of the apparatus with various elements removed showing all of the shearing blades in an up position.
Figure 16:
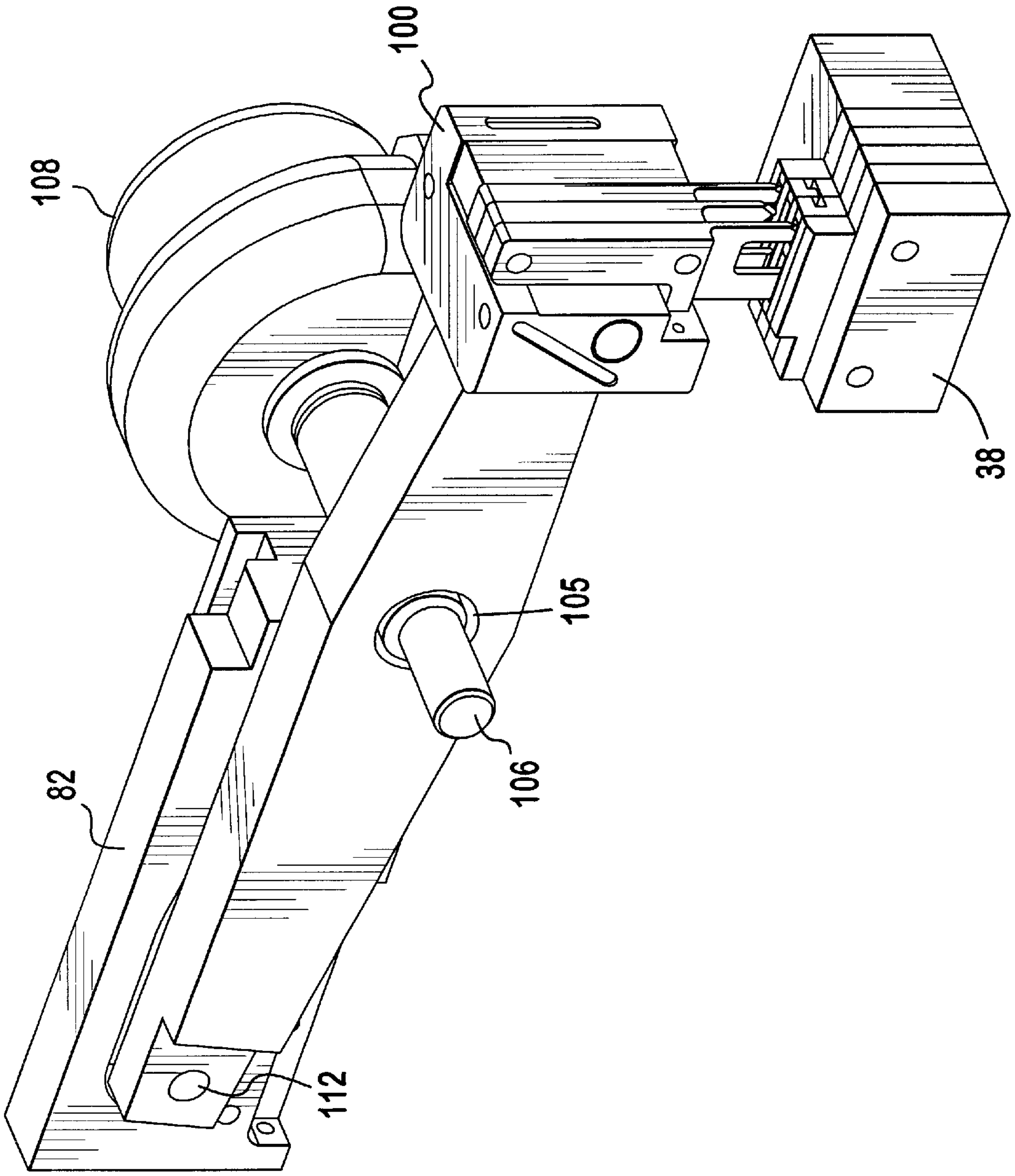
FIG. 16 is a partial perspective view of the apparatus with various elements removed showing the end shearing blades in a down position.
Figure 17:
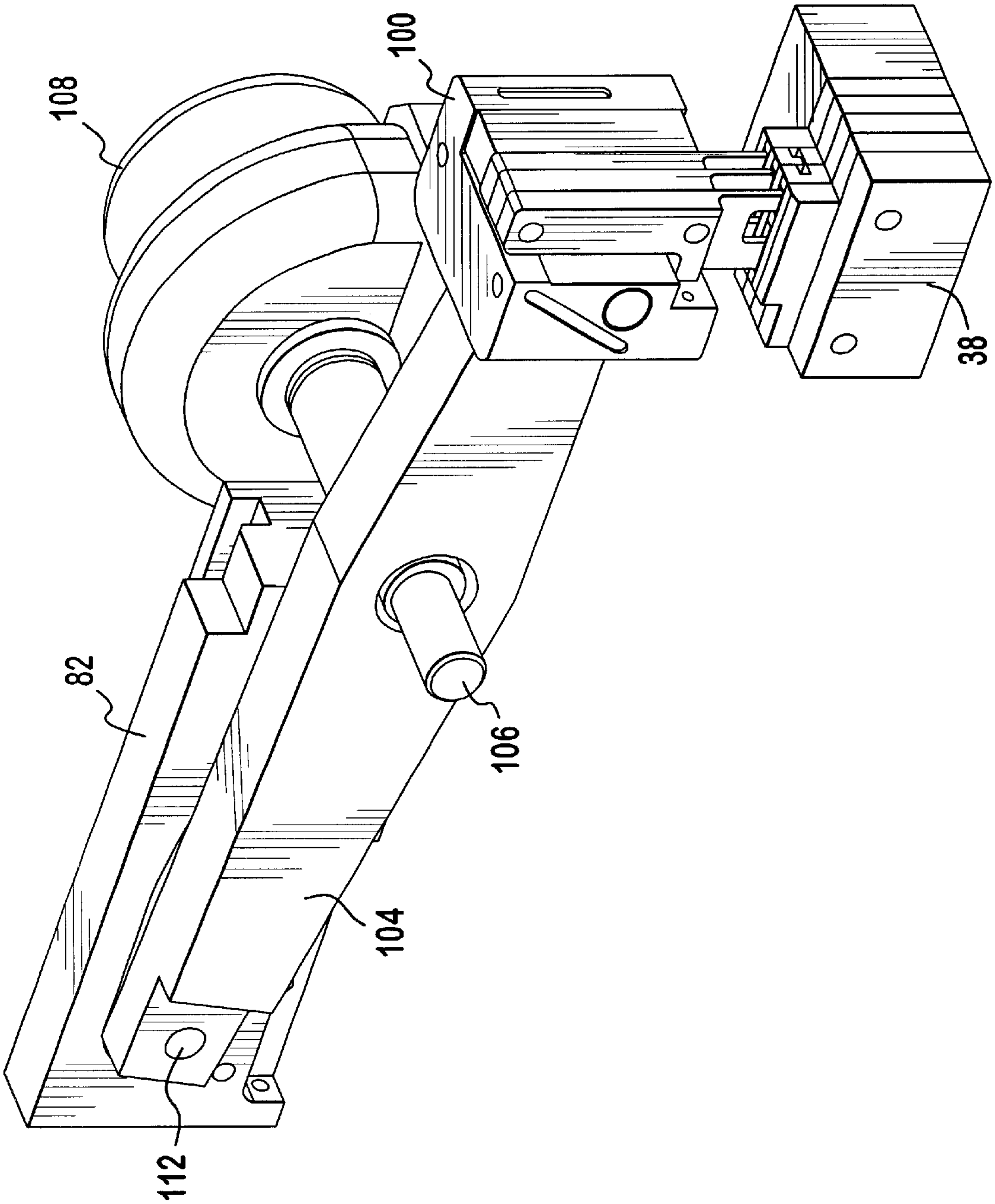
FIG. 17 is a partial perspective view of the apparatus with various elements removed showing the middle shearing blade in a down position.

Referring to FIGS. 14 and 15, the first slide sub-assembly 62 has a camming block 82 that extends from and cooperates with the first piston rod 58. The camming block 82 has a profiled cam track 114 that extends from proximate a back surface of the camming block 82 to proximate an oppositely facing front surface. A cam follower 112 is attached to a lever 104 that cooperates with the cam track 114. The lever 104 extends from the cam follower 112 in a direction away from a back surface of the camming block 82. The lever 104 has an opening 105, shown in FIG. 15, that extends from one side surface through to an oppositely facing side surface. The opening 105 is dimensioned to receive an eccentric pin 106 therein.

Figure 18:
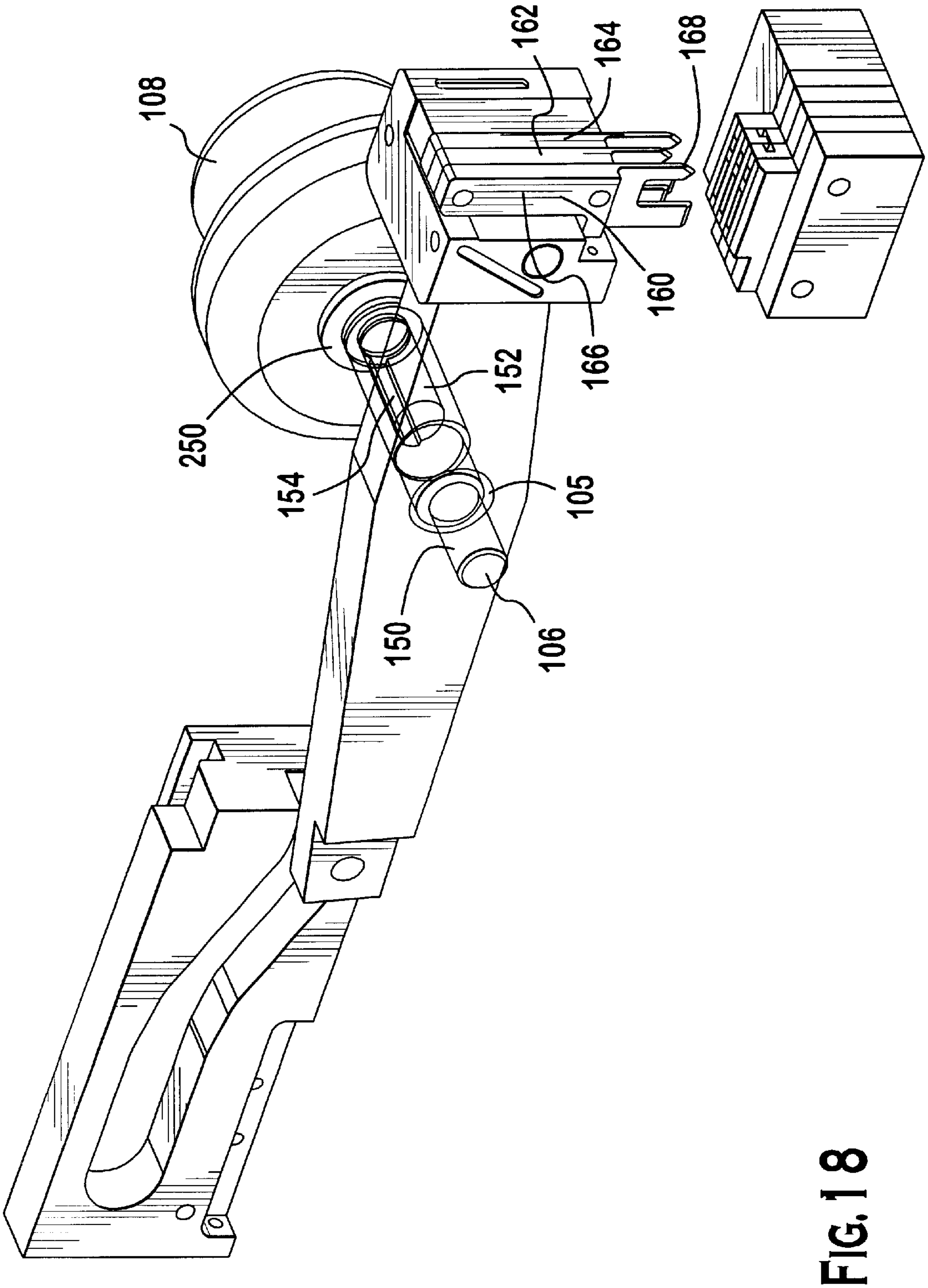
FIG. 18 is a partial perspective view of the shearing blade drive mechanism when all of the shearing blades are in the up position, as shown in FIG. 15.
Figure 19:
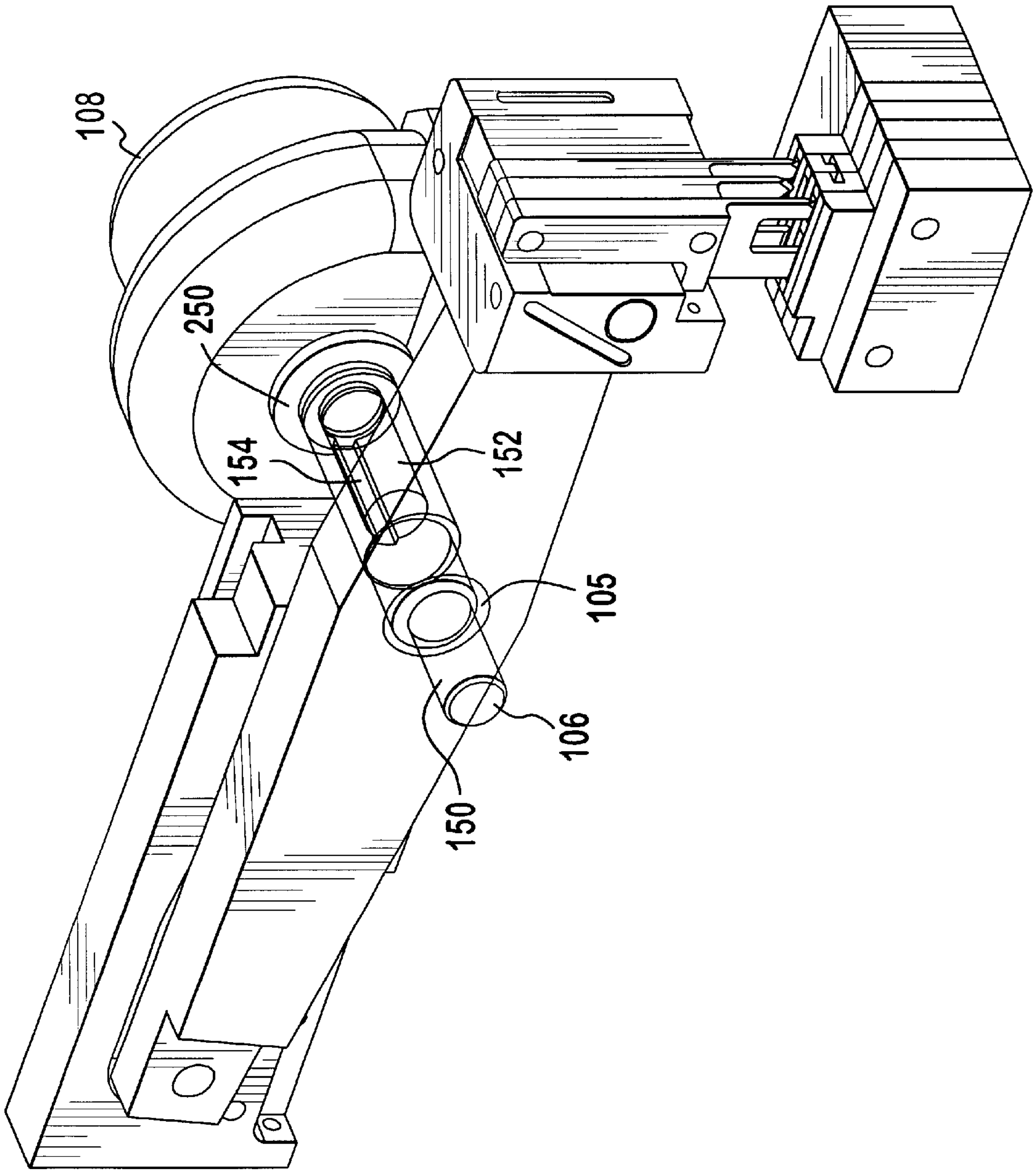
FIG. 19 is a partial perspective view of the shearing blade drive mechanism when the end shearing blades are in a down position, as shown in FIG. 16.
Figure 20:
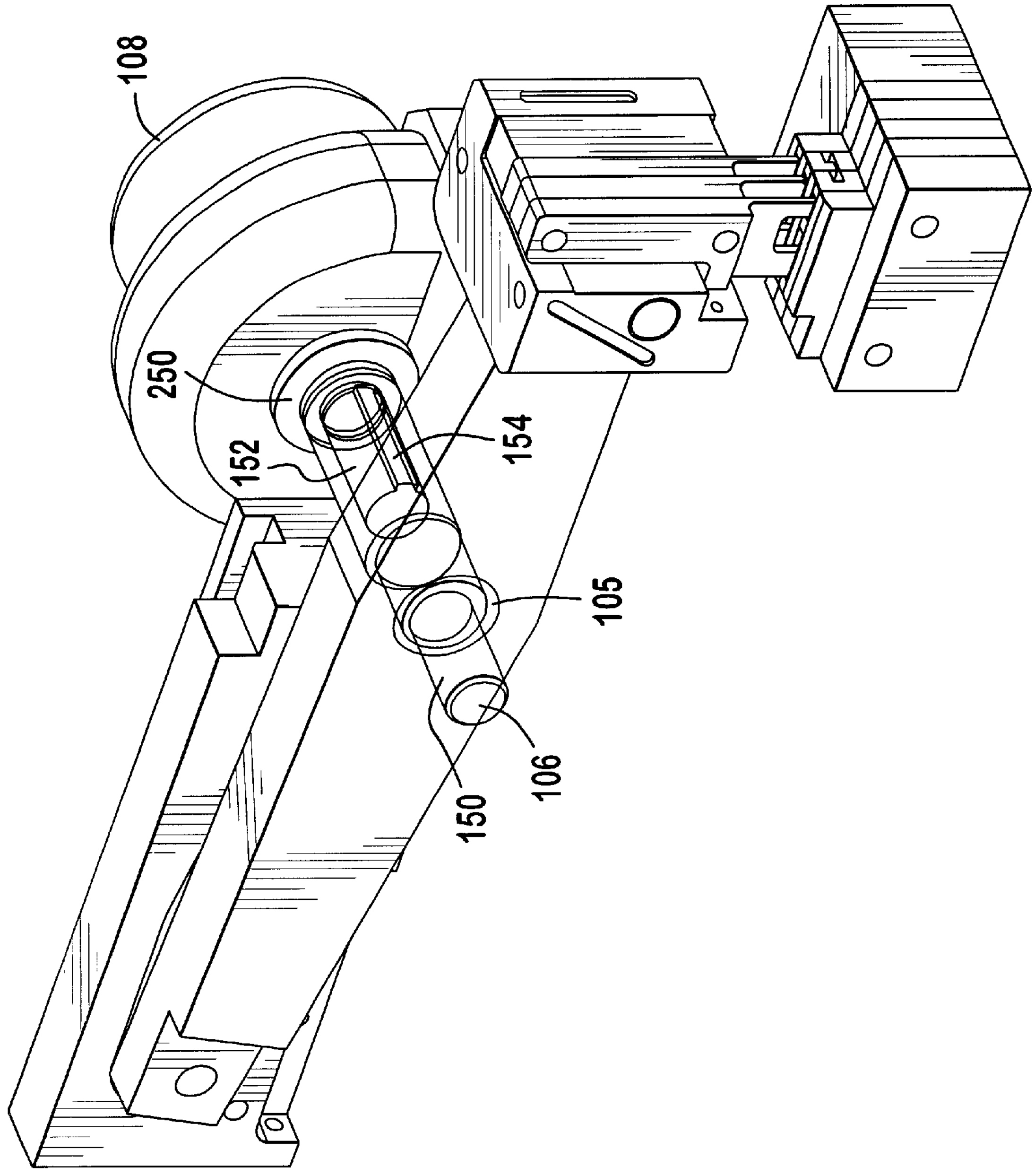
FIG. 20 is a partial perspective view of the shearing blade drive mechanism when the middle shearing blade is in a down position, as shown in FIG. 17.

As best shown in FIGS. 18–20, the eccentric pin 106 has a portion 150 that has a generally circular cross-section and a portion 152 which has a circular cross-section with a flat surface 154 provided thereon. The eccentric pin 106 is attached to a rotary activator 108. The rotary actuator 108 is of the type commercially available and will not be described herein. The eccentric pin 106 acts as the pivot point for the lever 104. An alignment sleeve 250 is positioned between the lever 104 and the rotary actuator 108. The alignment sleeve 250 is configured to insure that the eccentric pin 106 is properly positioned.

The lever 104 has a slot (not shown) at an opposite end from the cam follower 112 for receiving a block receiving pin 102. The slot (not shown) extends from an end surface of the lever 104 to an oppositely facing end surface. The block receiving pin 102 also cooperates with an opening (not shown) provided in a blade housing block 100. The block receiving pin 102 extends through the recess (not shown) such that when the blade housing block 100 is positioned on the lever 104, the slot (not shown) of the lever 104 cooperates with the block receiving pin 102 to allow the block receiving pin 102 and the blade housing block 100 to have limited pivoting movement about the end of the lever 104. The block receiving pin 102 is maintained in the slot (not shown) in any conventional manner.

The blade housing block 100 has a recess (not shown) that extends from a surface of the blade housing block 100 inward. The recess (not shown) is dimensioned to receive the end of the lever 104 that receives the block receiving pin 103 therein. As shown in FIG. 18, blade assemblies 160, 162, 164 are provided in the blade housing block 100. The blade assemblies 160, 162, 164 are located between opposed surfaces of support blocks 130, 132. The support block 130 has been omitted from FIG. 18 in order to better show the blade assemblies 160, 162, 164, but may be seen in FIG. 14. The support blocks 130, 132 are maintained in assembled relationship by fasteners. Each blade assembly 160, 162, 164 has a mounting section 166 positioned within the blade housing block 100 and a guide post 168 positioned proximate the respective shearing blades 49, 50, 51. The mounting sections 166 are positioned adjacent each other and are dimensioned to insure that proper spacing is maintained between the shearing blades 49, 50, 51. The guide posts 168 extend from the mounting sections 166 in the same direction as the shearing blades 49, 50, 51. The mounting sections 166 are positioned proximate the shearing blades 49, 50, 51 to help maintain the positioning of the shearing blades 49, 50, 51 as they are moved between the open position and the termination position. The mounting sections are maintained 166 in the blade housing block 100 by pins or the like. Suitable clearance slot means are provided in the support blocks 130, 132 to permit vertical movement of the pin relative to the support blocks 130, 132. In the embodiment shown, the number of blade assemblies 160, 162, 164 shown is three. However, any number of blade assemblies may be incorporated without departing from the scope of the invention.

Referring to FIGS. 14 and 15, the guide member 38 is positioned below the blade housing block 100 and is mounted on the base plate 52. The guide member 38 is a portion of the second slide sub-assembly 64. Openings 170 that align with the respective shearing blades 49, 50, 51 are provided on a top surface of the guide member 38. As shown more clearly in FIGS. 10 and 12, the openings 170 extend downward and intersect the feed path of the terminal strip 23. Upper and lower spaces 156, 136 are provided between the shearing blades 49, 50, 51 to maintain the spacing thereof. The spacers are maintained in assembled relationship by fasteners. Although the guide member 38 is shown having a particular configuration, the guide member 38 may be designed differently to accommodate different terminals therein.

The operation of the apparatus shown in FIGS. 13–20 will now be described in greater detail. As previously described, the terminal strip 23 is fed in the direction indicated by the arrow A in FIG. 15 from a suitable supply source such as a reel by means of a reciprocating feed block (not shown). The feed block (not shown) is of any type commonly known in the industry. A representative feed block with a typical feed pawl is described more fully in U.S. Pat. No. 4,099,316 that is hereby incorporated by reference.

Upon the receipt of the terminals 2 in the insertion zone 39, the first piston rod 58 is actuated and drives the first slide sub-assembly 62 forward. As this occurs, the cam follower 112 slides in the cam track 114 causing the lever 104 to pivot about the eccentric pin 106. It will be apparent from the shape of the cam track 114 that during the working stroke of the first slide sub-assembly 62 that the camming block 82 moves to the right from the position shown in FIG. 15 to the position shown in FIG. 17. The lever 104 will be swung through a slight clockwise arc and the blade housing block 100 will be moved relatively towards the insertion zone 39 thereby to lower the severing blades 49, 50, 51.

As the lever 104 pivots, the shearing blades 49, 50, 51 are forced into cooperation with the carrier strip 36. The shearing blades 49, 50, 51 are driven and held temporarily in an initial shearing position because of the horizontally extending end portion of the cam track 114. In this initial shearing position, the blades 49, 51 have sheared the carrier strip 36 and the middle shearing blade 50 is maintained above the carrier strip 36. The middle shearing blade 50 is maintained approximately 0.050 inches above the carrier strip 36 in this position. If it is desired to have the terminals 2 bridged or shunted, the initial shearing position is also the final shearing position. Consequently, the middle shearing blade 50 will never shear the respective portion of the carrier strip 36 which is provided thereunder.

If the terminals 2 are to be separated into individual or unbridged terminals 2, the rotary actuator 108 is activated causing the eccentric pin 106 to rotate. As the eccentric pin 106 rotates, the outside surface of the pin 106 engages an inside driver surface of opening 105 of the lever 104 causing the lever 104 to drive the blades 49, 50, 51 to a second shearing position. The rotation of the rotary actuator 108 through 180 degrees may cause the lever 104 and the blades 49, 50, 51 to move downward an additional 0.150 inches. As this occurs, the middle shearing blade 50 engages and shears the carrier strip 36 between the terminals 2. The blades 49, 50 are also driven further down. This second shearing position defines the final shearing position if the terminals 2 are not to be bridged.

Once moved to the desired final shearing position, the blades 49, 50, 51 are returned to the open position to accept additional terminals 2.

While the invention has been described with respect to the insertion of terminals and the termination of wires therein, the scope of the invention is directed more broadly to the insertion of various types of terminals into a respective housing. This is extremely advantageous and may be used whether or not the apparatus also shears the wires that may be terminated in the terminals. By incorporating the type of variable position feature, the apparatus has the flexibility of terminating bridged or unbridged terminals without the need to change tooling. This allows the apparatus to be programmed to provide a different termination in each cycle, allowing the bobbin or the housing to be precisely and efficiently loaded by utilizing a single apparatus. This eliminates the cost of storing and transporting the bobbins or the housings between operations.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

We claim:

1. An apparatus for inserting terminals carried on a carrier strip into cavities in a housing, comprising:

a slide assembly having a cam track movable between a first and a second position;

a pivoting lever having a cam follower, the cam follower positioned in and cooperating with the cam track, the pivoting lever is movable between an open position and a closed position, the pivoting lever having first and second shearing blades which cooperate with an end of the lever opposite the cam follower end; and an eccentric pin extending through the pivoting lever, the eccentric pin attached to a rotary actuator, the eccentric pin positioned to act as the pivot point for the pivoting lever, the rotary actuator movable between an engaged and disengaged position;

whereby as the pivoting lever is moved to the closed position, the first shearing blades engage and shear a first portion of the carrier strip of the terminals, and as the rotary actuator moves to an engaged position, the second shearing blade engages and shears a second portion of the carrier strip.

2. The apparatus of claim 1, further comprising a blade housing block attached to the pivoting lever at the end of the lever opposite the cam follower end which housing block houses the first and second shearing blades.

3. The apparatus of claim 2, wherein the blade housing block is pivotedly mounted to the pivoting lever.

4. The apparatus of claim 3, wherein the blade housing block has a recess that receives the end of the pivoting lever.

5. The apparatus of claim 1, wherein the eccentric pin has a substantially circular cross-section and a portion which has a circular cross-section and a flat surface provided thereon.

6. The apparatus of claim 1, further comprising an alignment sleeve positioned between the pivoting lever and the rotary actuator.

7. The apparatus of claim 1, further comprising a guide member having an insertion zone for receiving the carrier strip and openings corresponding to the first and second shearing blades that receive the first and second shearing blades to shear the carrier strip.

8. The apparatus of claim 7, further comprising spacers positioned between the openings for guiding the first and second shearing blades.

9. The apparatus of claim 7, wherein the first and second shearing blades remain in the guide member to guide the terminals when the terminals are inserted into a housing.

10. The apparatus of claim 1, wherein the pivoting lever is moved through a substantially clockwise arc as the pivoting lever is moved to the closed position.

11. The apparatus of claim 1, wherein the second shearing blade is positioned about 0.050 inches from the carrier strip before the rotary actuator is rotated.

12. The apparatus of claim 1, wherein the eccentric pin rotates as the rotary actuator moves between the engaged and disengaged position and engages a driver surface of the pivoting lever to move the second shearing blade toward the second portion of the carrier strip.

13. The apparatus of claim 12, wherein the first shearing blades continue to move through the first portion of the carrier strip as the second shearing blade is moved toward the second portion of the carrier strip.

14. The apparatus of claim 13, wherein the first and second shearing blades move about an additional 0.150 inches when the rotary actuator moves between the engaged and disengaged position.

15. An apparatus for inserting terminals carried on a carrier strip into cavities in a housing, comprising:

a slide assembly that moves a pivoting lever between an open and closed position;

first and second shearing blades cooperating with an end of the pivoting lever, the first shearing blades engage and shear a first portion the carrier strip of the terminals when the lever is in the closed position; and a rotary actuator attached to the pivoting lever by an eccentric pin that extends through the pivoting lever, the rotary actuator moves the second shearing blade to engage and shear a second portion of the carrier strip when the rotary actuator is moved from an engaged to a disengaged position.

16. The apparatus of claim 15, further comprising a blade housing block attached to the pivoting lever that houses the first and second shearing blades.

17. The apparatus of claim 16, wherein the blade housing block is pivotedly mounted to the pivoting lever.

18. The apparatus of claim 17, wherein the blade housing block has a recess that receives the end of the pivoting lever.

19. The apparatus of claim 15, wherein the eccentric pin has a substantially circular cross-section and a portion which has a circular cross-section and a flat surface provided thereon.

20. The apparatus of claim 15, further comprising an alignment sleeve positioned between the pivoting lever and the rotary actuator.

21. The apparatus of claim 15, further comprising a guide member having an insertion zone for receiving the carrier strip and openings corresponding to the first and second shearing blades that receive the first and second shearing blades to shear the carrier strip.

22. The apparatus of claim 21, further comprising spacers positioned between the openings for guiding the first and second shearing blades.

23. The apparatus of claim 21, wherein the first and second shearing blades remain in the guide member to guide the terminals when the terminals are inserted into a housing.

24. The apparatus of claim 15, wherein the pivoting lever is moved through a substantially clockwise arc as the pivoting lever is moved to the closed position.

25. The apparatus of claim 15, wherein the second shearing blade is positioned about 0.050 inches from the carrier strip before the rotary actuator is moved.

26. The apparatus of claim 15, wherein the eccentric pin rotates as the rotary actuator moves between the engaged and disengaged position and engages a driver surface of the pivoting lever to move the second shearing blade toward the second portion of the carrier strip.

27. The apparatus of claim 26, wherein the first shearing blades continue to move through the first portion of the carrier strip as the second shearing blade is moved toward the second portion of the carrier strip.

28. The apparatus of claim 27, wherein the first and second shearing blades move about an additional 0.150 inches when the rotary actuator moves between the engaged and disengaged position.

* * * * *

UNITED STATES PATENT AND TRADEMARK OFFICE

CERTIFICATE OF CORRECTION

PATENT NO. : 6,807,719 B2

DATED : October 26, 2004

INVENTOR(S) : Herr et al.

It is certified that error appears in the above-identified patent and that said Letters Patent is hereby corrected as shown below:

Title page,
Item [57], ABSTRACT,
Line 2, "having" has been changed to -- has --.
Line 3, "second position, and" should read -- second position and --.

Column 8,
Line 17, "pivotedly" has been changed to -- pivotally --.

Column 9,
Line 7, "pivotedly" has been changed to -- pivotally --.

Signed and Sealed this

Eighteenth Day of January, 2005

JON W. DUDAS
*Director of the United States Patent and Trademark Office*